No. 628,936. Patented July 18, 1899.
A. C. GULICK.
INSECT SCREEN.
(Application filed Aug. 23, 1898.)
(No Model.)
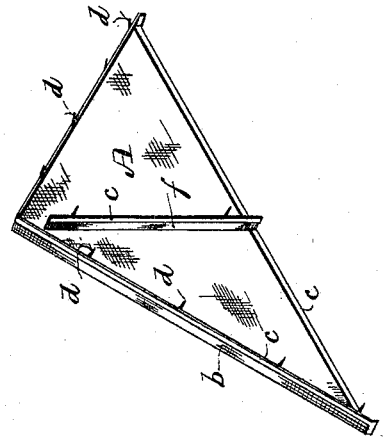
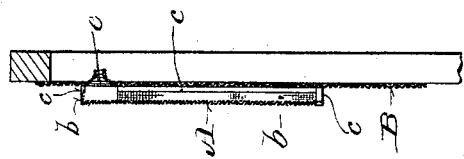
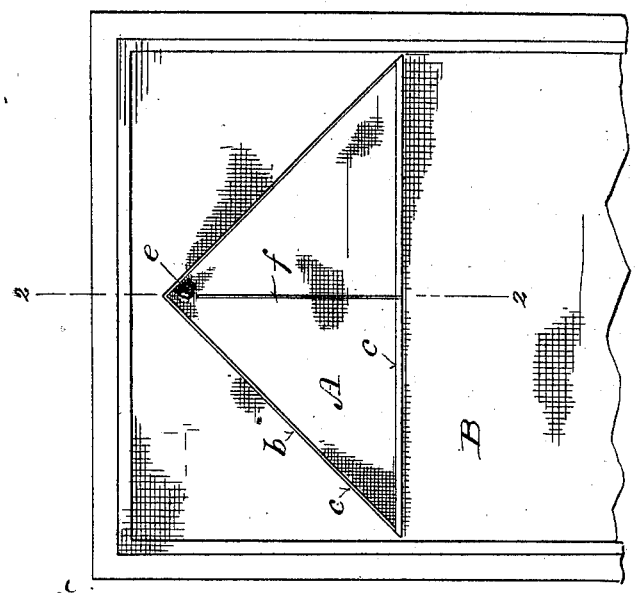
Witnesses:
Geo. W. Toung,
N. E. Oliphant
Inventor
Arthur C. Gulick
By H. G. Underwood
Attorney

UNITED STATES PATENT OFFICE.

ARTHUR C. GULICK, OF KENOSHA, WISCONSIN.

INSECT-SCREEN.

SPECIFICATION forming part of Letters Patent No. 628,936, dated July 18, 1899.

Application filed August 23, 1898. Serial No. 689,328. (No model.)

*To all whom it may concern:*

Be it known that I, ARTHUR C. GULICK, a citizen of the United States, and a resident of Kenosha, in the county of Kenosha and State of Wisconsin, have invented certain new and useful Improvements in Insect-Screens; and I do hereby declare that the following is a full, clear, and exact description thereof.

My invention has for its object to permit and encourage egress of insects that alight upon the inside of an insect-screen positioned for use.

Therefore said invention consists in a manufacture constituting an insect-screen attachment, as well as in the combination of a peculiarly-organized insect-screen and said attachment, as hereinafter particularly set forth with reference to the accompanying drawings and subsequently claimed.

Figure 1 of the drawings represents an elevation of a portion of an insect-screen provided with an attachment in accordance with my invention; Fig. 2, a sectional view on the plane indicated by line 2 2 in the preceding figure, and Fig. 3 a perspective view of the aforesaid attachment.

Referring by letter to the drawings, A represents a preferably triangular sheet of wire-gauze insect-screen material having those edges thereof that converge from base to apex bent at right angles to form spacing-flanges $b$ throughout their length, and all the edges are provided with a sheet-metal binder $c$, that prevents fraying of the wire-gauze and stiffens the device.

While I have thus far described a preferred construction, it would be no departure from my invention to have the spacing-flanges of my device other than partly wire-gauze.

As herein shown, the sheet-metal-bound upwardly-converging edges of the aforesaid device are preferably provided with a series of flexible prongs $d$, that serve as means for fastening said device to the inside of an insect-screen of common knowledge, although various means may be devised for the same purpose.

From the foregoing description and accompanying illustrations it will be readily understood that when my device is made fast to an insect-screen B there will be an open space between the latter and lower edge of the former; so that insects alighting on the inside of said screen may find their way in between the same and said device. The screen having been provided with a puncture $e$ within the confines of the trap that is formed by my attachment, the insects will find egress to the open air through said puncture, the latter being preferably conical in an outward direction, as best illustrated in Fig. 2. The screen attachment being triangular, it is preferable to have the above-described puncture located near the apex of said attachment, and it is also preferable to provide the latter with at least one vertical rib $f$, that constitutes a partition and extends from the lower edge to a height less than said puncture in the screen. The partition divides the trap into compartments that converge toward the egress-puncture in the screen, and said trap being thus divided insects caught therein will more rapidly find their way in an upward direction toward said puncture, it being a well-known fact that insects tend to travel up rather than down, even though they take a zigzag course of ascent.

The partition herein shown and described is preferably of wire-gauze material having a sheet-metal edge-binder, and, as herein shown, it may be provided with flexible fastening-prongs similar to those above specified.

Insect-screen attachments in accordance with my invention may be manufactured for the trade to be put on previously-made screens or they may be combined with screens at the factory; but in any event it is essential that said screens be provided with punctures within the confines of said attachments large enough to permit the escape of trapped insects to the open air.

It is well known that insects seek the greatest light. Therefore the necessary puncture in a screen provided with my attachment may be of considerable area without fear of its serving as an inlet for insects, and said attachment being triangular the insects are more readily diverted toward said puncture than would be otherwise the case.

Having thus described my invention, what I claim as new, and desire to secure by Letters Patent, is—

1. As an attachment for an insect-screen, a sheet of screen material having all edges thereof except the lower one provided with spacing-flanges throughout their length, and fastening devices extending from the flanges.

2. As an attachment for an insect-screen, a sheet of screen material having all edges except the lower ones thereof provided with spacing-flanges throughout their length, and a vertical rib extending from said lower edge to a point less than full distance across said sheet on the flange side of the latter.

3. As an attachment for an insect-screen, a triangular sheet of wire-gauze having its inclined edges bent at right angles to form spacing-flanges and a sheet-metal binder on all edges of said sheet.

4. As an attachment for an insect-screen, a triangular sheet-metal-bound sheet of wire-gauze having its inclined edges bent at right angles to form spacing-flanges, and a vertical rib extending from the lower edge of said sheet to a point below the apex of the latter on the flange side thereof.

5. An insect-screen provided with a puncture of sufficient area for passage of insects, in combination with an attachment consisting of a sheet of screen material having all edges except the lower one thereof provided with spacing-flanges throughout their length made fast to the inside of the screen in position to form a trap having said puncture for its outlet, and a vertical partition arranged in the trap having less elevation than the aforesaid puncture.

6. As an article of manufacture, an attachment for insect-screens comprising a triangular hood made of a single piece of wire fabric bent at edges thereof to form inwardly-extending flanges meeting each other at the apex of the hood, and a vertical partition intermediate of the flanges extending to an elevation somewhat less than the hood apex, the inner edge of the partition and the edges of said flanges being abutted against a wall having an aperture for the escape of insects above said partition, the lower broad end of the hood being open.

In testimony that I claim the foregoing I have hereunto set my hand, at Kenosha, in the county of Kenosha and State of Wisconsin, in the presence of two witnesses.

ARTHUR C. GULICK.

Witnesses:
MICHAEL HARKIN,
ALBERT E. BUCKMASTER.